US012739947B2

(12) United States Patent
Su et al.

(10) Patent No.: US 12,739,947 B2
(45) Date of Patent: Sep. 15, 2026

(54) ELECTROTHERMAL FILM STRUCTURE, ELECTROTHERMAL FILM HEATING DEVICE AND METHOD FOR MANUFACTURING ELECTROTHERMAL FILM

(71) Applicant: Micron Optoelectronics Co., Ltd., Shenzhen (CN)

(72) Inventors: Wei Su, Shenzhen (CN); Shourong Hu, Shenzhen (CN); Guoliang Zhang, Shenzhen (CN); Yu Su, Shenzhen (CN)

(73) Assignee: Micron Optoelectronics Co., Ltd., Shenzhen (CN)

( * ) Notice: Subject to any disclaimer, the term of this patent is extended or adjusted under 35 U.S.C. 154(b) by 890 days.

(21) Appl. No.: 17/990,052

(22) Filed: Nov. 18, 2022

(65) Prior Publication Data

US 2023/0217549 A1 Jul. 6, 2023

(30) Foreign Application Priority Data

Dec. 31, 2021 (CN) ......................... 202111682972.X

(51) Int. Cl.
*H05B 3/20* (2006.01)
*H05B 1/02* (2006.01)

(52) U.S. Cl.
CPC ................. *H05B 3/20* (2013.01); *H05B 1/02* (2013.01); *H05B 2203/007* (2013.01); *H05B 2203/013* (2013.01); *H05B 2203/017* (2013.01)

(58) Field of Classification Search
CPC .......... H05B 3/18; H05B 3/36; H05B 1/0294; H05B 2203/013
See application file for complete search history.

(56) References Cited

U.S. PATENT DOCUMENTS 5,412,181 A * 5/1995 Giamati ................. H05B 3/342 219/548
6,408,644 B1 * 6/2002 Williams ............... H05B 6/804 62/497
7,332,865 B2 * 2/2008 Hori ......................... H01J 11/44 313/582
8,722,458 B2 * 5/2014 Rogers .................. H10W 90/00 438/107
2006/0221529 A1 * 10/2006 Kim ..................... H05B 1/0241 361/103

(Continued)

FOREIGN PATENT DOCUMENTS

CN 103576723 A 2/2014
CN 104427738 A 3/2015

(Continued)

OTHER PUBLICATIONS

First Office Action issued in counterpart Chinese Patent Application No. 202111682972.X, dated Dec. 21, 2024.

*Primary Examiner* — Woody A Lee, Jr.
(74) *Attorney, Agent, or Firm* — Westbridge IP LLC

(57) ABSTRACT

An electrothermal film structure includes a supporting layer, a meshed conductive circuit layer and a transparent optical layer. The meshed conductive circuit layer provided on the supporting layer includes several micron-level conductive circuits distributed in a mesh, and the transparent optical layer is provided on the meshed conductive circuit layer. The meshed conductive circuit layer comprises a plurality of meshed conductive circuit units.

6 Claims, 5 Drawing Sheets

(56) References Cited

U.S. PATENT DOCUMENTS

| | | | | |
|---|---|---|---|---|
| 2008/0012287 | A1* | 1/2008 | Saxby | G09F 3/04 283/81 |
| 2022/0078890 | A1* | 3/2022 | Pai | H05B 3/84 |

FOREIGN PATENT DOCUMENTS

| | | | | | |
|---|---|---|---|---|---|
| CN | 107277950 | A | * | 10/2017 | H05B 3/08 |
| CN | 110248429 | A | * | 9/2019 | H05B 3/02 |
| CN | 111073395 | A | * | 4/2020 | H05B 3/34 |
| CN | 111148294 | A | | 5/2020 | |
| CN | 112333861 | A | * | 2/2021 | H01M 10/615 |
| CN | 112337648 | A | * | 2/2021 | B01D 46/681 |
| CN | 112399653 | A | * | 2/2021 | H05B 3/03 |
| CN | 113784465 | A | | 12/2021 | |
| CN | 113811093 | A | | 12/2021 | |
| CN | 216795309 | U | | 6/2022 | |
| JP | 2010251230 | A | * | 11/2010 | B32B 17/10036 |
| KR | 20170106538 | A | * | 9/2017 | A01G 9/1438 |
| NO | 147975 | B | * | 4/1983 | H05B 3/36 |
| WO | WO-2019212380 | A1 | * | 11/2019 | H05B 3/36 |
| WO | WO-2022006655 | A1 | * | 1/2022 | H05K 9/0094 |

* cited by examiner

ELECTROTHERMAL FILM STRUCTURE, ELECTROTHERMAL FILM HEATING DEVICE AND METHOD FOR MANUFACTURING ELECTROTHERMAL FILM

CROSS-REFERENCE TO RELATED APPLICATIONS

This application claims priority to Chinese Patent Application No. 202111682972.X, filed on Dec. 31, 2021, the entire contents of which are incorporated herein by reference.

TECHNICAL FIELD

The present disclosure relates to the technical field of electronics, in particular to an electrothermal film structure, an electrothermal film heating device and a method for manufacturing an electrothermal film.

BACKGROUND

The conductive circuit in the existing electrothermal films is usually made of resistance wire. When being used, due to bending, flexing and other factors, the resistance wire with a large diameter will be damaged, resulting in an increased resistance value and a concentrated heat generation at local positions of the conductive circuit. With the use time prolonging, conductive circuit is easily fused at positions where heat is concentrated, resulting in a failure of the electrothermal films. Therefore, how to improve a bending resistance of the electrothermal films has become an urgent technical problem to be solved.

The foregoing description is to provide general background information and does not necessarily constitute prior art.

SUMMARY

The present disclosure provides an electrothermal film structure, an electrothermal film heating device and a method for manufacturing an electrothermal film, aiming to solve the problem that how to improve the bending resistance of the electrothermal films.

In order to achieve the above objective, the present disclosure provides an electrothermal film structure. The electrothermal film structure includes a supporting layer, a meshed conductive circuit layer, and a transparent optical layer. The meshed conductive circuit layer provided on the supporting layer includes several micron-level conductive circuits distributed in a mesh, and the transparent optical layer is provided on the meshed conductive circuit layer.

In an embodiment, the meshed conductive circuit layer includes a plurality of meshed conductive circuit units provided between the supporting layer and the transparent optical layer, and the plurality of meshed conductive circuit units are connected to an external power supply.

In an embodiment, the meshed conductive circuit layer further includes a plurality of reserved meshed conductive circuit units. A working heating circuit is composed of the plurality of meshed conductive circuit units, and a plurality of reserved heating circuits are composed of the plurality of reserved meshed conductive circuit units.

In order to achieve the above objective, the present disclosure further provides an electrothermal film heating device. The electrothermal film heating device includes the electrothermal film structure as mentioned above, and a control circuit. A set of ports on the control circuit is connected to the working heating circuit, another set of ports on the control circuit is connected to the reserved heating circuit, and the control circuit is configured to keep the electrothermal film structure working in a safe power range.

In an embodiment, the control circuit includes a sampling module and a control module, the sampling module is configured to collect a working parameter corresponding to the working heating circuit and transmit the working parameter to the control module, and the control module is configured to determine a working mode corresponding to the electrothermal film structure according to the working parameter.

In an embodiment, the control module is further configured to determine a working heating power corresponding to the working heating circuit according to the working parameter, and the control module is further configured to control the reserved heating circuit to work when the working heating power is not within the safe power range.

In an embodiment, the control module is further configured to determine a compensation heating power according to the working heating power when the working heating power is not within the safe power range, to make the reserved heating circuit work based on the compensation heating power.

In an embodiment, the control module is further configured to keep the working heating circuit in a working state when the working heating power is in the safe power range.

In order to achieve the above objective, the present disclosure further provides a method for manufacturing an electrothermal film, including following operations:

- processing a conductive copper foil shaped in a whole surface as a meshed conductive circuit layer;
- bonding a supporting layer, the meshed conductive circuit layer and a transparent optical layer to obtain an intermediate electrothermal film; and
- bonding the intermediate electrothermal film and a cover layer to obtain the electrothermal film.

In an embodiment, the operation of processing the conductive copper foil shaped in the whole surface as the meshed conductive circuit layer includes:

- exposing the conductive copper foil shaped in the whole surface to obtain an exposed conductive copper foil;
- developing the exposed conductive copper foil to obtain a developed conductive copper foil;
- etching the developed conductive copper foil according to a preset mesh number to obtain an etched conductive copper foil; and
- stripping the etched conductive copper foil to obtain the meshed conductive circuit layer.

In the present disclosure, the electrothermal film structure includes a supporting layer, a meshed conductive circuit layer, a transparent optical layer, and a cover layer. The meshed conductive circuit layer provided on the supporting layer includes several micron-level conductive circuits distributed in a mesh, and the transparent optical layer is provided on the meshed conductive circuit layer. The meshed conductive circuit layer in the electrothermal film structure is completely wrapped by the supporting layer and the transparent optical layer, thereby avoiding the environmental corrosion and a damage to the meshed conductive circuit layer due to the environmental corrosion. Further, the meshed conductive circuit layer includes several micron-level conductive circuits distributed in a mesh. Since the width of the conductive circuits is at the micron level, the bending resistance of the electrothermal film can be significantly improved.

BRIEF DESCRIPTION OF THE DRAWINGS

In order to more clearly illustrate the embodiments of the present disclosure, drawings used in the embodiments or the related art will be briefly described below. Obviously, the drawings in the following description are only some embodiments of the present disclosure. It will be apparent to those skilled in the art that other figures can be obtained according to the structures shown in the drawings without creative work.

Figure 1:
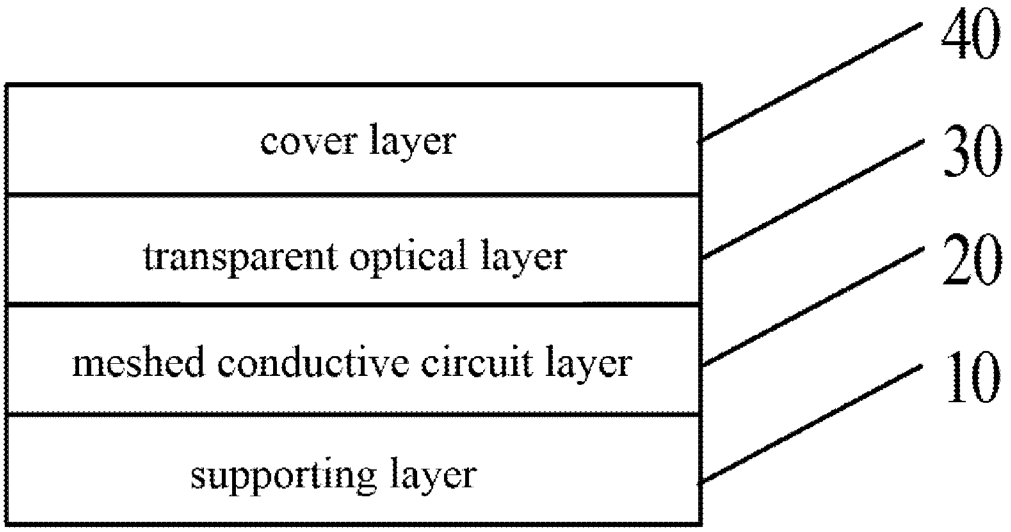
FIG. 1 is a schematic structural diagram of an electrothermal film structure according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In addition, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Referring to FIG. 1, FIG. 1 is a schematic structural diagram of an electrothermal film structure according to an embodiment of the present disclosure.

As shown in FIG. 1, in an embodiment of the present disclosure, the electrothermal film structure includes a supporting layer 10, a meshed conductive circuit layer 20 and a transparent optical layer 30. The meshed conductive circuit layer 20 is provided on the supporting layer 10 and the transparent optical layer 30 is provided on the meshed conductive circuit layer 20.

It should be noted that the supporting layer 10 may be a polyethylene terephthalate (PET) layer made of PET material, which is an optically transparent film.

It can be understood that the transparent optical layer 30 can be an optically clear adhesive (OCA) which is a special adhesive for bonding transparent optical elements. With the advantages of high clarity, high transmittance, high adhesion, and high resistance to weather, water, temperature, and ultraviolet ray, the OCA not only makes an adhesion thickness controllable to provide a uniform adhesion spacing, but also avoids yellowing, stripping and deterioration problems when the transparent optical layer 30 is used for a long time. The transparent optical layer 30 in an embodiment is used for bonding the cover layer 40 to the meshed conductive circuit layer 20.

It should be understood that the meshed conductive circuit layer 20 in an embodiment is completely wrapped by the supporting layer 10 and the transparent optical layer 30, thereby avoiding the environmental corrosion and a damage to conductive circuits due to the environmental corrosion.

In an embodiment, the electrothermal film structure may further include a cover layer 40 provided on the transparent optical layer 30. The cover layer 40 can be a PET layer made of the PET material, and the cover layer 40 is an optically transparent film. The cover layer 40 is a part protective layer which will be torn off when the whole machine is used. The meshed conductive circuit layer 20, the transparent optical layer 30 and the cover layer 40 are all provided on the supporting layer 10.

The meshed conductive circuit layer 20 includes several micron-level conductive circuits distributed in a mesh.

Figure 2:
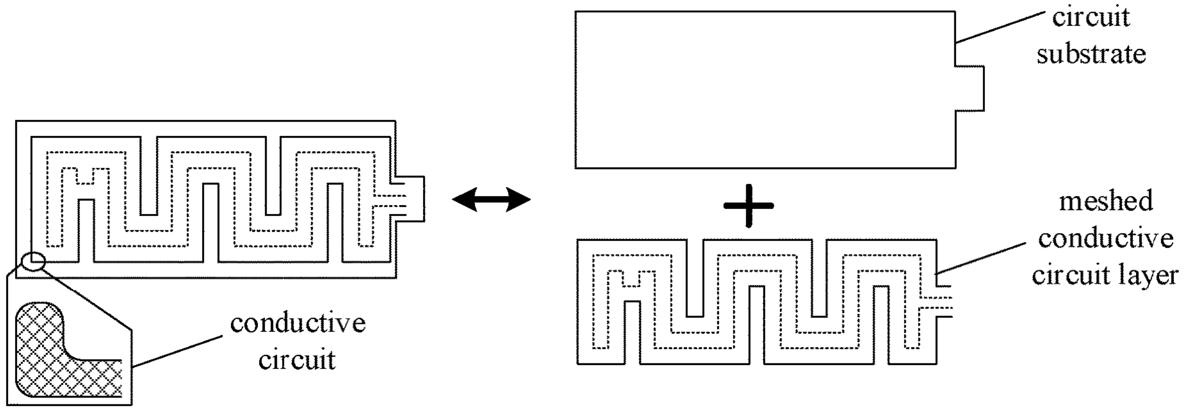
FIG. 2 is a schematic structural diagram of a circuit according to an embodiment of the present disclosure.

Further, referring to FIG. 2, FIG. 2 is a schematic structural diagram of a circuit according to an embodiment of the present disclosure.

As shown in FIG. 2, the circuit substrate includes a supporting layer 10, a transparent optical layer 30 and a cover layer 40.

It can be understood that, in an embodiment, during the manufacturing process of the meshed conductive circuit layer 20, a conductive copper foil shaped in a whole surface can be selected. According to the use requirements, a common material weight can be ⅓ OZ, ½ OZ, 1 OZ, etc., which is not specifically limited in present disclosure.

In an embodiment, a circuit with subtle metal mesh, namely the meshed conductive circuit layer 20 in the present disclosure, can be produced by processing the conductive copper foil shaped in a whole surface with the following production processes: exposing, developing, etching, stripping, and inspecting. The mesh number can be 50 mesh or 100 mesh, which can be set according to the actual situation and is not specifically limited in the present disclosure. The width of the conductive circuit produced by the above method can reach a micron level, such as 2μ~70 μm. When the thickness of the conductive copper foil shaped in a whole surface is thin and the width of the conductive circuit is narrow, the bending resistance of the electrothermal film is significantly improved.

In an embodiment, the electrothermal film structure includes a supporting layer 10, a meshed conductive circuit layer 20 and a transparent optical layer 30. The meshed conductive circuit layer 20 provided on the supporting layer 10 includes several micron-level conductive circuits distributed in a mesh, and the transparent optical layer 30 is provided on the meshed conductive circuit layer 20. In an embodiment, the meshed conductive circuit layer 20 is completely wrapped by the supporting layer 10 and the transparent optical layer 30, thereby avoiding the environmental corrosion and a damage to conductive circuits due to the environmental corrosion. Further, the meshed conductive circuit layer 20 includes several micron-level conductive circuits distributed in a mesh. Since the width of the conductive circuits is at the micron level, the bending resistance of the electrothermal film can be significantly improved.

Figure 3:
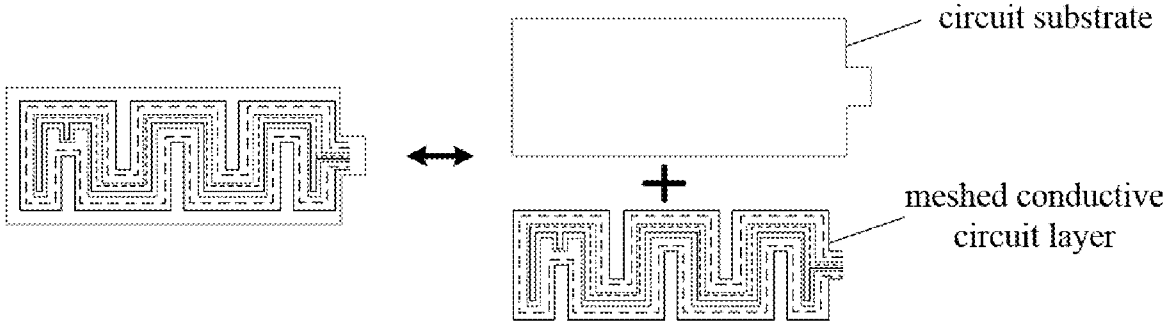
FIG. 3 is a schematic internal structural diagram of the electrothermal film structure according to another embodiment of the present disclosure.

Further, referring to FIG. 3, FIG. 3 is a schematic internal structural diagram of the electrothermal film structure according to another embodiment of the present disclosure.

As shown in FIG. 3, the meshed conductive circuit layer 20 includes a plurality of meshed conductive circuit units provided between the supporting layer 10 and the transparent optical layer 30, and the plurality of meshed conductive circuit units are connected to an external power supply.

It should be noted that the circuit substrate in FIG. 3 also includes a supporting layer 10, a transparent optical layer 30 and a cover layer 40. The meshed conductive circuit units are distributed in a mesh, and the width of the conductive circuits is at the micron level. Since the copper foil in an initial state is shaped in a whole surface, adverse consequences such as material waste, an extended process, and a cost increase and so on can be avoided during manufacturing one meshed conductive circuit unit and manufacturing a plurality of meshed conductive circuit units.

It can be understood that only when the plurality of meshed conductive circuit units are connected to an external power supply, the meshed conductive circuit units can work, that is, the meshed conductive circuit units start to generate heat.

Further, the meshed conductive circuit layer 20 further includes a plurality of reserved meshed conductive circuit units. A working heating circuit is composed of the meshed conductive circuit units, and a plurality of reserved heating circuits are composed of the plurality of reserved meshed conductive circuit units.

It should be noted that the structure of the meshed conductive circuit unit is distributed in a mesh, which is the same as each structure of the plurality of reserved meshed conductive circuit units. The meshed conductive circuit unit is the main heating unit, and the reserved meshed conductive circuit unit is the secondary heating unit. Only when the meshed conductive circuit unit generates heat insufficiently, the reserved meshed conductive circuit unit will generate heat.

It can be understood that there may be a plurality of reserved meshed conductive circuit units. The corrosion condition of the meshed conductive circuit may be considered to determine the number of reserved meshed conductive circuit units, and the number is not specifically limited in the present disclosure.

It should be understood that a working heating circuit may be composed of the meshed conductive circuit units, and a plurality of reserved heating circuits may be composed of the plurality of reserved meshed conductive circuit units. When the working heating circuit cannot provide enough heat, auxiliary heat needs to be provided by a plurality of reserved meshed conductive circuits, to enable the working heating circuit and the plurality of reserved heating circuits to work at the same time, thereby providing the required heat.

Figure 4:
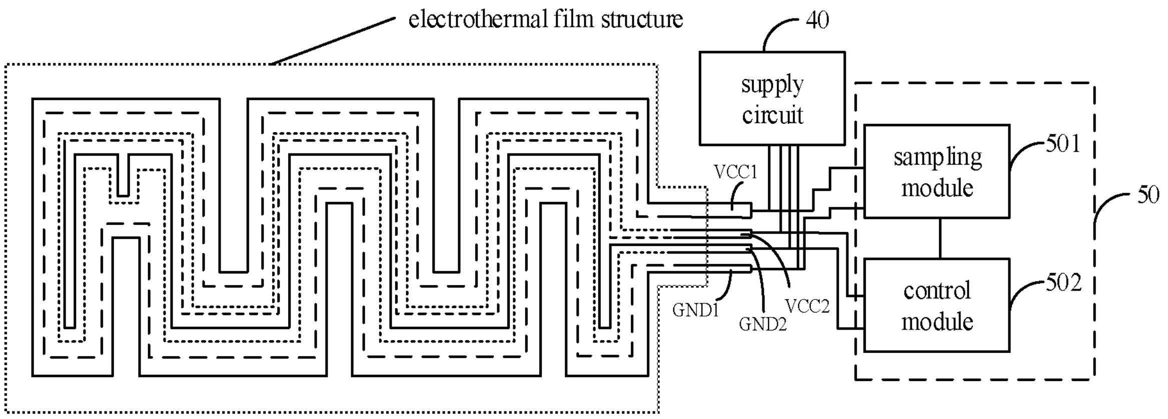
FIG. 4 is a schematic structural diagram of a circuit of an electrothermal film heating device according to an embodiment of the present disclosure.

In order to achieve the above objective, the present disclosure further provides an electrothermal film heating device. Referring to FIG. 4, FIG. 4 is a schematic structural diagram of a circuit of an electrothermal film heating device according to an embodiment of the present disclosure.

As shown in FIG. 4, the electrothermal film heating device includes the above-mentioned electrothermal film structure and a control circuit 50. An end of the control circuit 50 is connected to a working heating circuit, and another end of the control circuit 50 is connected to a reserved heating circuit. The control circuit 50 is configured to keep the electrothermal film structure working in a safe power range.

It can be understood that, a heating circuit can be formed by the electrothermal film structure, and the control circuit 50 controls a working state of the heating circuit. The heating circuit includes a working heating circuit and a plurality of reserved heating circuits.

In an embodiment, the control circuit 50 enables the electrothermal film structure to work in a safe power range.

Further, in an embodiment, the electrothermal heating device includes a supply circuit 40. The supply circuit 40 is respectively connected to the working heating circuit and the reserved heating circuit and supplies power to the working heating circuit and the reserved heating circuit through the ports such as the volt current condenser 1 (VCC1) port, the GND1 port, the volt current condenser 2 (VCC2) port, and the GND2 port.

Further, the control circuit 50 includes a sampling module 501 and a control module 502. The sampling module 501 is configured to collect a working parameter corresponding to the working heating circuit and transmit the working parameter to the control module 502.

It should be noted that the sampling module 501 can collect working parameters corresponding to the working heating circuit, and the working parameters can include the power, the voltage, the current, the temperature parameters corresponding to the working heating circuit, and other parameters generated when the working heating circuit is working, which is not specifically limited in the present disclosure.

The control module 502 is configured to determine a working mode corresponding to the electrothermal film structure according to the working parameter.

Further, the control module 502 is further configured to determine the working heating power corresponding to the working heating circuit according to the working parameters.

It can be understood that, in an embodiment, the working heating power corresponding to the working heating circuit can be determined by the control module 502 according to the working parameters. And the specific calculation formula used to determine the working heating power can be the product of the voltage and the current corresponding to the working heating circuit, or the square of the voltage divided by a resistance value in the working heating circuit, and the voltage corresponds to the working heating circuit. Or the specific calculation formula used to determine the working heating power can be other calculation formulas, which is not specifically limited in the present disclosure.

The control module 502 is further configured to control the reserved heating circuit to work when the working heating power is not within the safe power range.

It should be understood that, in actual situations, each working mode corresponds to a different safe power range, and the working mode can be a heating mode, a heat preservation mode, etc. The corresponding relationship between the specific working mode and the safe power range can be determined according to the actual situation, which is not limited in the present disclosure.

In an embodiment, due to a corrosion condition or other conditions of the meshed conductive circuit unit in the working heating circuit, the heating power of the working heating circuit is not within the safe power range. In this case, the reserved heating circuit is controlled to work until the heating power of the whole electrothermal film is in the safe power range.

Further, when the working heating power is not within the safe power range, the control module 502 is further configured to determine a compensation heating power according to the working heating power, to make the reserved heating circuit work based on the compensation heating power.

It can be understood that the range of the compensation heating power can be obtained by subtracting the working heating power from the safe power range. In this case, the reserved heating circuit can work according to the compensation heating power, that is, the heating power of the reserved heating circuit is the above-mentioned compensation heating power.

In an embodiment, a maximum heating power corresponding to each reserved heating circuit can be obtained in advance, and when the compensation heating power is higher than the maximum heating power corresponding to the first reserved heating circuit, the control module 502 can control the second reserved heating circuit to generate heat until the heating power of each reserved heating circuit is higher than the compensation heating power.

Further, the control module 502 is configured to keep the working heating circuit in a working state when the working heating power is in the safe power range.

It can be understood that when the working heating power corresponding to the working heating circuit is in the safe power range, the working state of the working heating circuit is maintained, that is, the control module 502 does not need to control the reserved heating circuit to work.

In an embodiment, the electrothermal film heating device includes an electrothermal film structure and a control circuit 50. An end of the control circuit 50 is connected to a working heating circuit, and another end of the control circuit 50 is connected to a reserved heating circuit. By the control circuit 50, the electrothermal film structure is kept working in the safe power range. When the working heating circuit is damaged, the reserved heating circuit can share part of the power, to achieve the purpose that the electrothermal film heating device can work in a safe power range, thereby prolonging the service life of the electrothermal film.

Figure 5:
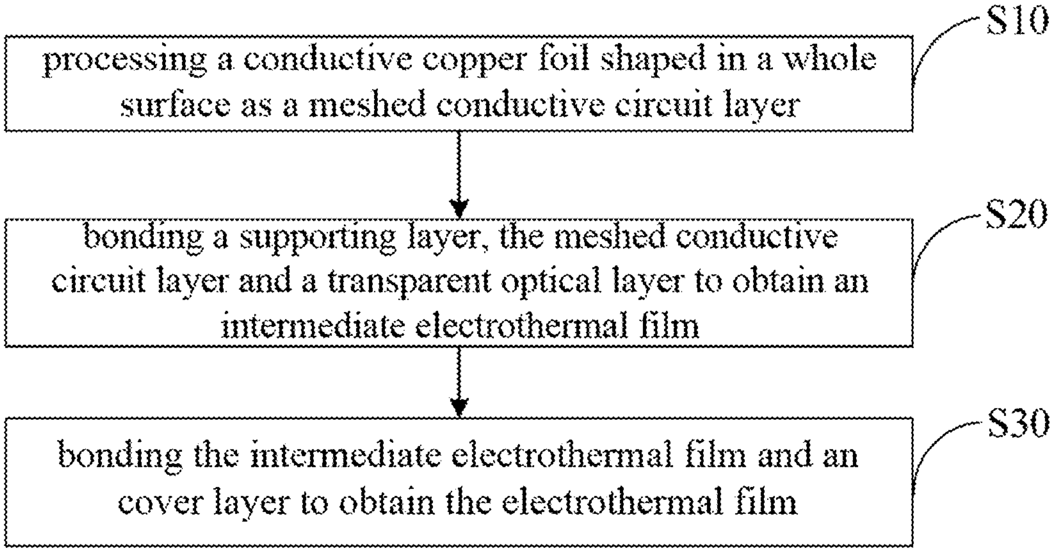
FIG. 5 is a schematic flowchart of a method for manufacturing an electrothermal film according to an embodiment of the present disclosure.

In addition, in order to achieve the above objective, the present disclosure further provides a method for manufacturing an electrothermal film. Referring to FIG. 5, FIG. 5 is a schematic flowchart of a method for manufacturing an electrothermal film according to an embodiment of the present disclosure.

As shown in FIG. 5, in an embodiment, the method for manufacturing an electrothermal film includes following operations.

Operation S10, processing a conductive copper foil shaped in a whole surface as a meshed conductive circuit layer 20.

It should be noted that copper foil is an anionic electrolytic material, namely, a thin, continuous metal foil precipitated in a base layer of the circuit board. As a conductor of the printed circuit board (PCB), the copper foil not only easily adheres to insulating layers, but also can be printed with a protective layer and form circuit patterns after the copper foil is etched.

Further, in an embodiment, the operation S10 includes:

exposing the conductive copper foil shaped in the whole surface to obtain an exposed conductive copper foil;

developing the exposed conductive copper foil to obtain a developed conductive copper foil;

etching the developed conductive copper foil according to a preset mesh number to obtain an etched conductive copper foil; and stripping the etched conductive copper foil to obtain the meshed conductive circuit layer 20.

It can be understood that, by exposing the conductive copper foil, for a photoresist of the part exposed to light, the speed dissolving in the developer solution can be different from that of a photoresist of the unexposed part, thus a transfer process of the pattern on the photomask can be performed, and an exposed conductive copper foil can be manufactured. The exposure types can be divided into three types: a contact type, a proximity type and a projection type, and the exposure type can be selected according to the actual situation in the present disclosure. The main control parameters in the exposure process are exposure energy, exposure GAP, exposure table temperature and so on.

It should be understood that the development process is to dissolve the (positive) photoresist, namely the photoresist of the part exposed to light, in the rapid developer solution (in contrast, the negative photoresist, namely the photoresist of the unexposed part, is dissolved in the developer solution), and the photoresist of the unexposed part is dissolved in the developer solution more slowly than the exposed part. Thus the pattern on the photomask, namely the developed conductive copper foil, can be revealed by controlling the development time. The main control parameters in the exposure process are the development conduction speed, the conductivity of the developer solution, the concentration of the developer solution, and the development spray pressure.

In an embodiment, the preset mesh number can be set according to the actual situation, such as 50 mesh, 100 mesh and so on, which is not specifically limited in present disclosure. The etching process is a process that the indium tin oxide (ITO) part which is not protected by the photoresist in the glass is corroded through a strong acid (hydrochloric acid) and a desired pattern is left. Thus, an etched conductive copper foil with a preset mesh number can be obtained. And the etched conductive copper foil is distributed in a mesh. In the etching process, the main control parameters are the etching solution concentration, the etching conduction speed, the spray pressure and so on.

In an embodiment, the stripping process refers to a process of removing the photoresist on the front and back sides of the glass through a strong alkali, and then the mesh conductive circuit layer can be obtained. The main control parameters in the stripping process are the stripping conduction speed, the stripping solution concentration, etc.

Operation S20, bonding the supporting layer 10, the meshed conductive circuit layer 20 and the transparent optical layer 30 to obtain an intermediate electrothermal film.

In an embodiment, the meshed conductive circuit layer 20 and the transparent optical layer 30 can be bonded by vacuum sputtering, glued lamination or glueless high-temperature lamination. After the meshed conductive circuit layer 20 and the transparent optical layer 30 are bonded, an intermediate electrothermal film can be produced.

Operation S30, bonding the intermediate electrothermal film and a cover layer 40 to produce the electrothermal film.

It can be understood that the cover layer 40 is a part protective layer which will be torn off when the whole machine is used. The intermediate electrothermal film and the cover layer 40 can be bonded by vacuum coating, and the electrothermal film can be produced after the intermediate electrothermal film and a cover layer 40 are bonded.

In an embodiment, the present disclosure further provides another method for manufacturing the electrothermal film. The method includes following operations. First, bonding the supporting layer 10 to the conductive copper foil shaped in a whole surface to obtain a conductive layer shaped in a whole surface. Then manufacturing the conductive layer shaped in the whole surface as a meshed conductive circuit layer 20. Further, bonding the meshed conductive circuit layer 20 and a transparent optical layer 30 to obtain an intermediate electrothermal film. Then bonding the intermediate electrothermal film and a cover layer 40 to obtain an electrothermal film.

It can be understood that the process of bonding the supporting layer 10 to the conductive copper foil shaped in a whole surface to obtain a conductive layer shaped in a whole surface can be realized by the physical vapor deposition (PVD). And the process of manufacturing the conductive layer shaped in the whole surface as a meshed conductive circuit layer 20 can be realized with the above-mentioned production processes: exposing, developing, etching, stripping, and inspecting.

In an embodiment, a conductive copper foil shaped in a whole surface is processed as a meshed conductive circuit layer 20. The supporting layer 10, the meshed conductive circuit layer 20 and the transparent optical layer 30 are bonded to obtain an intermediate electrothermal film. The intermediate electrothermal film and the cover layer 40 are bonded to obtain the electrothermal film. In the present disclosure, the conductive copper foil shaped in a whole surface is processed as a meshed conductive circuit layer 20, and the meshed conductive circuit layer 20 includes several micron-level conductive circuits distributed in a mesh. Since the width of the conductive circuits is at the micron level, the bending resistance of the electrothermal film can be significantly improved.

The above are only some embodiments of the present disclosure, and do not limit the scope of the present disclosure thereto. Any equivalent structure transformation made according to the description and drawings of the present disclosure, or direct/indirect application in other related technical fields are included in the scope of the present disclosure.

What is claimed is:

1. An electrothermal film structure, comprising:

a supporting layer;

a meshed conductive circuit layer; and a transparent optical layer, wherein the meshed conductive circuit layer provided on the supporting layer comprises several micron-level conductive circuits distributed in a mesh, and the transparent optical layer is provided on the meshed conductive circuit layer;

the meshed conductive circuit layer comprises a plurality of meshed conductive circuit units provided between the supporting layer and the transparent optical layer, and the plurality of meshed conductive circuit units are connected to an external power supply;

the meshed conductive circuit layer further comprises a plurality of reserved meshed conductive circuit units;

a working heating circuit is composed of the plurality of meshed conductive circuit units; and a plurality of reserved heating circuits are composed of the plurality of reserved meshed conductive circuit units.

2. An electrothermal film heating device, comprising:

the electrothermal film structure of claim 1; and a control circuit, wherein a set of ports on the control circuit is connected to the working heating circuit, another set of ports on the control circuit is connected to one of the plurality of reserved heating circuits, and the control circuit is configured to keep the electrothermal film structure working in a safe power range.

3. The electrothermal film heating device of claim 2, wherein:

the control circuit comprises a sampling module and a control module;

the sampling module is configured to collect a working parameter corresponding to the working heating circuit and transmit the working parameter to the control module; and the control module is configured to determine a working mode corresponding to the electrothermal film structure according to the working parameter.

4. The electrothermal film heating device of claim 3, wherein:

the control module is further configured to determine a working heating power corresponding to the working heating circuit according to the working parameter; and the control module is further configured to control the reserved heating circuit to work when the working heating power is not within the safe power range.

5. The electrothermal film heating device of claim 4, wherein the control module is further configured to determine a compensation heating power according to the working heating power when the working heating power is not within the safe power range, to make the reserved heating circuit work based on the compensation heating power.

6. The electrothermal film heating device of claim 4, wherein the control module is further configured to keep the working heating circuit in a working state when the working heating power is in the safe power range.

* * * * *